United States Patent
Li et al.

(10) Patent No.: US 10,077,211 B2
(45) Date of Patent: Sep. 18, 2018

(54) CEMENT GRINDING AIDS PREPARED WITH WASTE ANTIFREEZE

(71) Applicant: NANJING TECH UNIVERSITY, Nanjing (CN)

(72) Inventors: Weifeng Li, Nanjing (CN); Suhua Ma, Nanjing (CN); Xiaodong Shen, Nanjing (CN)

(73) Assignee: NANJING TECH UNIVERSITY, Nanjing (CN)

( * ) Notice: Subject to any disclaimer, the term of this patent is extended or adjusted under 35 U.S.C. 154(b) by 183 days.

(21) Appl. No.: 15/301,240

(22) PCT Filed: Sep. 29, 2015

(86) PCT No.: PCT/CN2015/091018
§ 371 (c)(1),
(2) Date: Sep. 30, 2016

(87) PCT Pub. No.: WO2016/184004
PCT Pub. Date: Nov. 24, 2016

(65) Prior Publication Data
US 2018/0141863 A1    May 24, 2018

(30) Foreign Application Priority Data
May 20, 2015  (CN) .......................... 2015 1 0259735

(51) Int. Cl.
| C04B 24/02 | (2006.01) |
| C04B 22/08 | (2006.01) |
| C04B 24/04 | (2006.01) |
| C04B 24/10 | (2006.01) |
| C04B 24/12 | (2006.01) |
| C04B 22/00 | (2006.01) |
| C04B 22/12 | (2006.01) |
| C04B 22/14 | (2006.01) |
| C04B 22/16 | (2006.01) |
| C04B 103/52 | (2006.01) |

(52) U.S. Cl.
CPC ............ C04B 24/02 (2013.01); C04B 22/002 (2013.01); C04B 22/08 (2013.01); C04B 22/082 (2013.01); C04B 22/122 (2013.01); C04B 22/141 (2013.01); C04B 22/165 (2013.01); C04B 24/04 (2013.01); C04B 24/10 (2013.01); C04B 24/12 (2013.01); C04B 2103/52 (2013.01)

(58) Field of Classification Search
CPC ......... C04B 24/02; C04B 24/04; C04B 24/10; C04B 24/12; C04B 22/002; C04B 22/082; C04B 22/122; C04B 22/141; C04B 22/165; C04B 2103/52; C04B 22/08
See application file for complete search history.

(56) References Cited

U.S. PATENT DOCUMENTS

| | | | | | |
|---|---|---|---|---|---|
| 3,615,785 | A | * | 10/1971 | Moorer ................... | C04B 28/04 106/724 |
| 4,204,877 | A | * | 5/1980 | Moorer ................... | B02C 23/06 106/724 |
| 4,643,362 | A | * | 2/1987 | Serafin ................... | B02C 23/06 106/728 |
| 4,828,624 | A | * | 5/1989 | Valle ...................... | B02C 23/06 106/680 |
| 5,348,583 | A | * | 9/1994 | Arfaei ..................... | C04B 24/00 106/696 |
| 5,429,675 | A | * | 7/1995 | Cheung ............... | C04B 40/0039 106/287.26 |
| 7,141,102 | B2 | * | 11/2006 | Fukutani .................. | C09K 3/18 106/14.44 |
| 8,083,850 | B2 | * | 12/2011 | Kimijima ............... | C04B 7/428 106/697 |
| 8,604,002 | B1 | * | 12/2013 | Walters ................ | A61K 31/739 106/13 |

FOREIGN PATENT DOCUMENTS

| CN | 102417321 A | * | 4/2012 | | |
| CN | 103274632 A | * | 9/2013 | | |
| DE | 4034217 A1 | * | 5/1991 | ......... | C04B 40/0039 |
| GB | 1302136 A | * | 1/1973 | ............. | C04B 24/02 |

* cited by examiner

*Primary Examiner* — Anthony J Green
(74) *Attorney, Agent, or Firm* — CBM Patent Consulting, LLC

(57) ABSTRACT

It discloses cement grinding aids prepared with waste antifreeze which comprises the following components in parts by weight: 20-75 parts of pretreated waste antifreeze, 5-40 parts of alkanolamine, 1-5 parts of acid solution, 3-12 parts of saccharide and 15-50 parts of water. The pretreated waste antifreeze is prepared by adding an alkaline solution into waste antifreeze to regulate the pH value, adding a flocculant, and stirring and standing; separating upper-layer oil, and then filtering to remove flocculent precipitates, thus obtaining a clear mixed solution.

10 Claims, No Drawings

US 10,077,211 B2

CEMENT GRINDING AIDS PREPARED WITH WASTE ANTIFREEZE

This application is the U.S. national phase of International Application No. PCT/CN2015/091018 filed on on 29 Sep. 2015 which designated the U.S. and claims priority to Chinese Application Nos. CN201510259735.0 filed on 20 May 2015, the entire contents of each of which are hereby incorporated by reference.

FIELD OF THE INVENTION

The present invention belongs to the field of chemical engineering, and specifically relates to cement grinding aids prepared with waste antifreeze

BACKGROUND OF THE INVENTION

An automobile engine anti-freeze coolant, also called antifreeze for short, is mainly composed of an antifreeze agent, an inhibitor, a buffer, a colorant, a defoamer, water and the like, is liquid that has cooling, anti-corrosion, anti-cavitation, anti-scaling, anti-boil and anti-freeze functions and the like and meets the working requirements of liquid-cooled engines at low temperatures, and is an indispensable heat dissipation medium for normal operation of automobile engines.

The antifreeze agent, as a main component, accounts for 92-98% of the antifreeze. Nearly all countries have adopted ethylene glycol as the antifreeze agent since 1950s; the freezing point is influenced by the concentration of the ethylene glycol, and is controlled within an appropriate range by mixing the ethylene glycol with water in a ratio based on local temperature: 40% ethylene glycol by mass is generally adopted in the south of China, while about 50% ethylene glycol by mass is relatively appropriate in the cold north.

The inhibitor is mainly used for preventing the ethylene glycol antifreeze from corroding cooling system materials (composed of copper, aluminum, cast iron, steel, solder, etc.) under high-temperature conditions, thus leading to decline of thermal conductivity of engines, blockage of cooler tubes and overheating of the engines. Inhibitors are divided into two classes: one is inorganic inhibitors, e.g., metasilicate, phosphate, borate, nitrite, molybdate, benzoate, etc.; and the other is organic inhibitors, e.g., common triethanolamine, benzotriazole, organic phosphate, etc. Multiple inhibitors need to be compounded to thoroughly prevent rust in the presence of multiple metals. The antifreeze available in the market and used in foreign patents all adopts a compound of multiple corrosion inhibiting matters, so the corrosion inhibiting rate is high; and the inhibitor accounts for 0.5-5% of the antifreeze by mass.

The buffer is used for stabilizing the pH value of the antifreeze to be 7.5-10, thereby avoiding decline of the pH value and the corrosion inhibiting effect caused by medium acidification; and the common buffer is borate and phosphate. The common defoamer is silicone, alcohols and glycidyl ether, and is 0.001-0.1% by mass. The colorant differs from common cooling water, facilitates observation of leakage of the antifreeze in an engine cooling system, also serves as an acid-base indicator, often adopts bromine methyl blue, phenol red, methyl red, etc., and is generally 0.01-0.05% by mass.

More than 90% of commercial automobile antifreeze adopts ethylene glycol as a main antifreeze agent at present. The ethylene glycol is colorless, odorless and slightly sweet liquid, and is an important basic chemical raw material. The oral lethal dose of the ethylene glycol is 80-100ml, the ethylene glycol may damage the central nervous system, gastrointestinal tract and renal functions, and the toxic symptoms are mainly caused by ethylene glycol metabolites. The general replacement cycle of the automobile antifreeze is 2 years or 60,000 kilometers, the annually replaced waste antifreeze is 450,000-600,000 tons based on 150 million automobile population in China at the end of 2014 (the consumption of antifreeze is 6-8 Kg per vehicle, and the replacement cycle is 2 years), and the annually replaced waste antifreeze will be increased with rapid increase of China's automobile population. The waste antifreeze is classified as a dangerous waste in Scrapped Motor Vehicle Disassembly Environment Protection Technical Specification of Environment Protection Industry Standards HJ348-2007 of the People's Republic of China. Thus, harmless and resourceful treatment and utilization of the waste antifreeze are put on the agenda.

The existing technologies and studies mainly focus on recycling the waste antifreeze or extracting ethylene glycol therein for use. Chinese invention patent ZL 95114044.2 discloses a waste antifreeze regenerating method: classifying waste antifreeze based on colors, measuring various metal corrosion and pH value, adding a flocculant, precipitating impurities, adding a preservative, an anti-rust agent and the like, adding an antifreeze agent and a dye, and then testing the antifreeze, and the antifreeze qualified upon testing is reused as automobile antifreeze In practice, antifreeze of different colors or brands, due to different components, generally react to generate gel or precipitates after being mixed, and similar problems can be avoided to a certain degree by classification based on the colors of the antifreeze, but the operation in the practical recovery flow is difficult, and the implementation is unattainable.

Chinese patent CN 203043722U discloses a waste antifreeze regeneration and filtration device composed of an adsorption layer, a filtration layer and an oil absorbing layer, wherein waste antifreeze from which various impurities, engine oil and the like are removed is used as a production raw material of automobile antifreeze Chinese patent CN 203999444U discloses a device for recovering ethylene glycol from waste automobile antifreeze, which is composed of a liquid storage tank, an alkali reactor, an acid reactor, a pressurizing and heating component, a flash tank and a reboiler, wherein recovered ethylene glycol is obtained after the technical measures of acidification, alkalization, pressurizing and heating, gas-liquid separation, flash evaporation and the like; and the recovered ethylene glycol can be reused as antifreeze or a raw material of other process products. The automobile antifreeze is sold to terminal customers in the form of small packages (4 L or 1 L), the price difference between renewable antifreeze and common non-renewable antifreeze is not obvious, and due to uncertainty about the quality of renewable products, customers tend to purchase the common non-renewable antifreeze with slightly higher price.

Ethylene glycol serving as a main component of the waste antifreeze is a main grinding aid raw material of a cement grinding aid. U.S. Pat. No. 2,225,146 discloses a method for preparing a cement grinding aid with alcohols (e.g., ethylene glycol, diethylene glycol, propylene glycol, triethylene glycol, etc.). U.S. Pat. No. 2,225,146 discloses a method for preparing a cement grinding aid with ethylene glycol and acetate of the ethylene glycol. Chinese patent CN94113758.9 discloses a hydraulic cement accelerator doped with polyols, containing a well-known accelerator and low molecular weight polyols (e.g., glycerol and ethylene glycol), and such an admixture is effective for shortening the initial setting time of hydraulic cement, mortar and concrete and is also beneficial as a low-temperature accelerator; and a preferred embodiment may also include components selected from some alkanol amines or a mixture thereof. Other components including metasilicate, phosphate, borate, nitrite or triethanolamine or the like in the waste antifreeze is often used as an early strength agent, a retarder or an inhibitor of cement concrete; silicone, alcohols, glycidyl ether and the like used as defoamers are also used as defoamers in cement concrete admixtures. Thus, the waste antifreeze can be used for preparing a cement grinding aid after residual heavy metal ions (e.g., copper ions, hexavalent chromium, etc.) as well as engine oil and solid impurities added in the waste antifreeze recovery flow are removed via appropriate technical processes.

In most of the existing technologies and studies, the waste antifreeze is regenerated into new antifreeze via the technical measures of acidification, alkalization, pressurizing and heating, gas-liquid separation, flash evaporation and the like or ethylene glycol is extracted from the waste antifreeze for secondary sale, the treatment process is complex, the equipment investment is high, the energy consumption is high and the economic benefit is not obvious.

SUMMARY OF THE INVENTION

In view of the drawbacks of the prior art, the technical problem to be solved by the present invention is to provide liquid cement grinding aids prepared with waste antifreeze To solve the above technical problem, the present invention adopts the following technical solution:

A cement grinding aid prepared with waste antifreeze includes the following components in parts by weight:

| | |
|---|---|
| pretreated waste antifreeze | 20-75 parts, |
| alkanolamine | 5-40 parts, |
| acid solution | 1-5 parts, |
| saccharide | 3-12 parts, |
| water | 15-50 parts. |

The cement grinding aid preferably includes the following components in parts by weight:

| | |
|---|---|
| pretreated waste antifreeze | 25-55 parts, |
| alkanolamine | 5-35 parts, |
| acid solution | 1-5 parts, |
| saccharide | 5-10 parts, |
| water | 20-40 parts. |

The pretreated waste antifreeze is prepared by the following method: adding an alkaline solution into waste antifreeze to regulate the pH value to 8-12, adding a flocculant, and stirring and standing; separating upper-layer oil, then filtering to remove flocculent precipitates, thus obtaining a clear mixed solution (that is, mixed liquid of ethylene glycol and other salts).

The alkaline solution is an aqueous solution of any of NaOH, KOH, triethanolamine, triisopropanolamine, diethanolisopropanolamine, N,N,N',N'-tetra(2-ethoxy)ethylenediamine (THEED) and ethanoldiisopropanolamine, wherein the mass concentration of the solute is within the range of 20-99%.

The flocculant is any one of or a mixture of several of aluminum sulfate, polyaluminum sulfate (PAS) and polyacrylamide (PAM). The mass ratio of the flocculant to the initial waste antifreeze (i.e., waste antifreeze not added with the alkaline solution) is (0.01-0.03):1.

The waste antifreeze is waste liquid replaced after a reuse cycle of automobile engine anti-freeze coolant, and is composed of a mixture of ethylene glycol, metasilicate, phosphate, borate, nitrite or silicone, colorant and the like.

The standing time is 2-8 hours.

The alkanolamine is any one of or a mixture of several of diethanolisopropanolamine (DEIPA), N,N,N',N'-tetra(2-ethoxy)ethylenediamine (THEED) and N-methyldiethanolamine (MEDA).

The acid solution is an aqueous solution of any one of acetic acid, sulfuric acid, hydrochloric acid and phosphoric acid, wherein the mass concentration of the solute is 30-99%.

The saccharide is at least one of or a mixture of several of molasses, corn syrup, glucose, saccharose and gluconic acid as well as salts of the glucose, saccharose or gluconic acid.

A preparation method of the cement grinding aid prepared with waste antifreeze includes: stirring the pretreated waste antifreeze, alkanolamine, acid solution, saccharide and water uniformly in a formula ratio in the conventional mode.

The adding quantity of the cement grinding aid prepared by the method of the present invention is 0.02-0.15% of the weight of cement.

It can be seen from the above technical solution that the present invention provides a method for preparing a cement grinding aid with waste antifreeze includes: adding an alkaline solution into waste antifreeze to regulate the pH value to 8-12, adding a certain amount of flocculant, and stirring and standing; separating a small amount of upper-layer oil, then filtering to remove flocculent precipitates, thus obtaining a clear mixed solution (that is, mixed liquid of ethylene glycol and other metasilicate, borate and the like); mixing the mixed solution of the pretreated waste antifreeze, alkanolamine, acid solution, saccharide and water, and stirring the mixture to obtain the cement grinding aid. The cement grinding aid can effectively improve the strength of silicate cement while aiding grinding and improving the output per machine.

Regarding resourceful treatment and reuse of waste antifreeze, in the prior art, the waste antifreeze is regenerated into new antifreeze via the technical measures of acidification, alkalization, pressurizing and heating, gas-liquid separation, flash evaporation and the like or ethylene glycol is extracted from the waste antifreeze for secondary sale, the treatment process flow is complex, the equipment investment is high, the energy consumption is high and the economic benefit is not obvious. In practice, antifreeze (particularly metasilicate containing products) of different colors or types generally react to generate gel or precipitates after being mixed, whereas it is basically difficult to classify according to colors in the recovery flow of the waste antifreeze to avoid such problems as precipitates or gel to a certain degree. On the other hand, antifreeze products are sold to terminal customers in the form of small packages (4 L or 1 L), the price difference between renewable antifreeze and common non-renewable antifreeze is not obvious, and due to uncertainty about the quality of renewable products, customers tend to purchase the common antifreeze with slightly higher price, which restricts the popularization and the application of the waste antifreeze regeneration technology to a certain degree at present.

Compared with the prior art, the present invention is simple in process, short in flow and easy to popularize. In the present invention, an alkaline solution is added to the waste antifreeze for regulating the pH value to 8-12, a certain amount of flocculant is added, and the mixture is stirred and is allowed to stand; a small amount of upper-layer oil is separated, filtration is carried out for removing flocculent precipitates, and a clear mixed solution (mixed liquid of ethylene glycol and other metasilicate, borate and the like) is obtained and used as a main raw material for preparing a liquid cement grinding aid. After the waste antifreeze is treated by the steps of pH regulation, flocculation, standing, separation and the like, not only are such heavy metal ions harmful to the performance of cement and the environment as hexavalent chromium, copper ions and the like removed, but also oil and solid residue (introduced in the waste antifreeze recovery flow) are separated. Moreover, ethylene glycol which is a main component in the waste antifreeze is a common cement grinding aid raw material; metasilicate, phosphate, borate, nitrite or triethanolamine, etc. serving as a corrosion inhibiting or buffering component in the antifreeze is often used as a retarder, an early strength agent or an inhibitor of cement, and since they have a small amount in the mixed liquid, they do not influence the performance of cement but are beneficial to improving the physical and chemical performance of the cement after entering the cement as components of the cement grinding aid; and the defoamer in the waste antifreeze is also often used as a component of the cement grinding aid.

The mixed solution of the pretreated waste antifreeze is mixed with water, alkanolamine, acid solution, saccharide and the like to obtain a liquid cement grinding aid.

Beneficial effects:

The present invention provides a preparation method of a liquid cement grinding aid prepared with waste antifreeze, including: firstly adding an alkaline solution into waste antifreeze to regulate the pH value to 8-12, adding a certain amount of flocculant, and stirring and standing; separating a small amount of upper-layer oil, then filtering to remove flocculent precipitates, thus obtaining a clear mixed solution (mixed liquid of ethylene glycol and other metasilicate, borate and the like) as a main raw material for preparing the liquid cement grinding aid; then mixing the mixed solution of the pretreated waste antifreeze with water, alkanolamine, acid solution, saccharide and the like to obtain the liquid cement grinding aid.

The waste antifreeze which is abundant and cheap is used as a main raw material in the present invention, and the method belongs to a resourceful utilization technology for a waste, so that the liquid cement grinding aid provided by the present invention has good application prospect. Ethylene glycol which is a main component in the waste antifreeze is a common cement grinding aid raw material; metasilicate, phosphate, borate, nitrite or triethanolamine or the like serving as an inhibitor or a buffer in the antifreeze is often used as a retarder, an early strength agent or an inhibitor of cement, and since they have a relatively small amount in the antifreeze, they are beneficial to improving the physical and chemical performance of the cement after entering the cement as components of the cement grinding aid. The defoamer in the waste antifreeze is also often used as a component of the cement grinding aid. In addition, the liquid cement grinding aid prepared in the present invention does not contain chlorine ions, so that steel bars are not corroded in use of cement. Meanwhile, the cement grinding aid enhancer prepared in the present invention is good in grinding aid performance and low in cost, can greatly improve the yield of cement and the strength of cement at each age, meets the requirements of national standards for cement products and cement grinding aids, and does not influence the durability of concrete. Experimental results show that when 0.03% of the cement grinding aid prepared in the present invention is added to compound silicate cement, the 3d/28d compressive strength is improved 2.8 Mpa and 4.9 Mpa respectively as compared with a reference sample.

The liquid cement grinding aid prepared in the present invention is suitable for various types of cement, and is preferably added to a ground cement material by using a metering pump.

DETAILED DESCRIPTION OF THE EMBODIMENTS

A clear and complete description of the technical solutions in the embodiments of the present invention will be given below. Apparently, the described embodiments are merely a part, but not all, of the embodiments of the present invention. The present invention can be better understood according to the following embodiments. However, those skilled in the art could easily understand that the specific material proportions, process conditions and results described in the embodiments are merely used for illustrating the present invention, rather than limiting the present invention described in detail in the claims. All of other embodiments, obtained by those of ordinary skill in the art based on the embodiments of the present invention without any inventive effort, fall into the protection scope of the present invention.

Embodiment 1:

The waste antifreeze used in embodiment 1 is selected from a waste storage tank in an automobile repair plant A, is light red turbid liquid, and has the pH value of 8. 100 g of the waste antifreeze A is selected, 5 g of 20 wt % NaOH solution is added for regulating the pH value to 11, then 3 g of polyaluminum sulfate (PAS) is added, and the solution is stirred and allowed to stand for 8 h. Upper-layer oil is separated, then filtration is carried out for removing flocculent precipitates and solid impurities, and 101 g of light pink mixed solution is obtained, wherein the mixed solution contains 35.5% of ethylene glycol and 58.2% of water by gas chromatography.

56 weight parts of the above mixed solution is sequentially mixed with 17 weight parts of water, 18 weight parts of diethanolisopropanolamine (DEIPA), 3 weight parts of acetic acid (99%) and 6 weight parts of molasses, and the mixture is stirred, to obtain a cement grinding aid, the adding amount of which is 0.03% of the mass of cement.

Embodiment 2:

The waste antifreeze used in embodiment 2 is selected from a waste storage tank in an automobile repair plant B, is light blue turbid liquid, and has the pH value of 8.5. 100 g of the waste antifreeze B is selected, 6 g of 85% triethanolamine solution is added for regulating the pH value to 9, then 1 g of polyacrylamide (PAM) is added, and the solution is stirred and allowed to stand for 5 h. Upper-layer oil is separated, then filtration is carried out for removing flocculent precipitates and solid impurities, and 96 g of light blue mixed solution is obtained, wherein the mixed solution contains 38.1% of ethylene glycol and 56.3% of water by gas chromatography.

40 weight parts of the above mixed solution is sequentially mixed with 25 weight parts of water, 10 weight parts of triethanolamine, 5 weight parts of triisopropanolamine, 5 weight parts of phosphoric acid solution (30%), 10 weight parts of corn syrup and 5 weight parts of saccharose, and the mixture is stirred, to obtain a cement grinding aid, the adding amount of which is 0.05% of the mass of cement.

Embodiment 3:

The waste antifreeze used in embodiment 3 is selected from a waste storage tank in a chemical waste liquid yard C, is rusty turbid liquid, and has the pH value of 9. 100 g of the waste antifreeze C is selected, 10 g of 99% N,N,N',N'-tetra (2-ethoxy)ethylenediamine (THEED) is added for regulating the pH value to 12, then 2 g of polyaluminium sulfate (PAS) is added, 1 g of polyacrylamide (PAM) is added after stirring, and the solution is stirred and allowed to stand for 2 h. Upper-layer oil is separated, then filtration is carried out for removing flocculent precipitates and solid impurities, and 92 g of light yellow mixed solution is obtained, wherein the mixed solution contains 34.3% of ethylene glycol and 62.1% of water by gas chromatography.

35 weight parts of the above mixed solution is sequentially mixed with 45 weight parts of water, 7 weight parts of triethanolamine, 2 weight parts of sulfuric acid solution (45%), 3 weight parts of diethanolisopropanolamine, 5 weight parts of saccharose and 3 weight parts of sodium gluconate, and the mixture is stirred, to obtain a cement grinding aid, the adding amount of which is 0.1% of the mass of cement.

Embodiment 4:

The waste antifreeze used in embodiment 4 is selected from an automobile maintenance site of an automobile repair plant D, is light red turbid liquid, and has the pH value of 7.5. 100 g of the waste antifreeze D is selected, 6 g of 85% triisopropanolamine solution is added for regulating the pH value to 8.5, 1.5 g of polyaluminium sulfate (PAS) is added, 1.5 g of polyacrylamide (PAM) is added after stirring, and the solution is stirred and allowed to stand for 4 h. Upper-layer oil is separated, then filtration is carried out for removing flocculent precipitates and solid impurities, and 105 g of light pink mixed solution is obtained, wherein the mixed solution contains 42.8% of ethylene glycol and 53.6% of water by gas chromatography.

28 weight parts of the above mixed solution is sequentially mixed with 45 weight parts of water, 4 weight parts of N,N,N',N'-tetra(2-ethoxy)ethylenediamine (THEED), 2 weight parts of triethanolamine (TEA), 1 weight part of acetic acid (99%) and 20 weight parts of corn syrup, and the mixture is stirred, to obtain a cement grinding aid, the adding amount of which is 0.15% of the mass of cement.

COMPARATIVE EXAMPLE 1:

56 weight parts of the waste antifreeze not pretreated in embodiment 1 is sequentially mixed with 17 weight parts of water, 18 weight parts of diethanolisopropanolamine (DEIPA), 3 weight parts of acetic acid (99%) and 6 weight parts of molasses, and the mixture is stirred, to obtain a cement grinding aid, the adding amount of which is 0.03% of the mass of cement. A large amount of flocculent precipitates are separated out at the bottom of the solution after stirring, and the solution is turbid with a little oil on the surface.

COMPARATIVE EXAMPLE 2:

56 weight parts of ethylene glycol solution (having the content of 35.5%, and prepared according to the ethylene glycol concentration of the mixed solution in embodiment 1) is sequentially mixed with 17 weight parts of water, 18 weight parts of diethanolisopropanolamine (DEIPA), 3 weight parts of acetic acid (99%) and 6 weight parts of molasses, and the mixture is stirred, to obtain a cement grinding aid, the adding amount of which is 0.03% of the mass of cement.

P.C32.5 cement is prepared according to table 1 below. Cement clinker and gypsum are firstly crushed to the diameter of less than 5 mm by a jaw crusher, and then are mixed uniformly with other materials according to a proportion.

TABLE 1

P.C32.5 cement material proportion

| Material name | Clinker | Gypsum | Water granulated slag | Limestone | Fly ash |
|---|---|---|---|---|---|
| Percentage % | 55 | 5 | 12 | 10 | 18 |

The cement grinding aids in embodiment 1 and comparative examples 1 and 2 are respectively added into cement, the cement is diluted and then fed into a laboratory mill for milling for 25 minutes, and 45 um sieving residue, specific surface area and 3d/28d breaking/compressive strength of the milled cement sample are respectively measured as table 2, wherein the blank sample in table 2 indicates a cement sample not added with any grinding aid but milled for the same time.

It can be seen from the comparison between embodiment 4 and embodiment 1 in table 2 that after the waste antifreeze provided in embodiment 1 of the present invention is modified, its application effect in the cement grinding aid is obviously improved, and particularly, the 3d and 28d compressive strengths are respectively increased 1.6 Mpa and 3.6 Mpa. It can be seen from the comparison between embodiment 1 and embodiment 2 in table 2 that the mixed liquid obtained after the waste antifreeze is treated can equivalently replace ethylene glycol in the traditional grinding aid formula, the grinding aid effect of the replacing product is similar, but the strengthening properties are better (3d/28d comprehensive strengths are respectively improved 0.5 Mpa and 1.3 Mpa), and the production cost of the cement grinding aid can be greatly reduced.

TABLE 2

Grinding aid and strengthening effect comparison between embodiment 1 and comparative examples 1 and 2

| | Adding amount/% | 45 um sieving residue/% | Specific surface area m$^2$/kg | Breaking/compressive strength/Mpa | |
|---|---|---|---|---|---|
| | | | | 3 d | 28 d |
| Blank sample | — | 15.8 | 386 | 3.6 15.8 | 7.5 36.2 |
| Comparative example 1 | 0.03 | 12.1 | 372 | 3.7 17.2 | 7.5 37.6 |
| Comparative example2 | 0.03 | 11.2 | 381 | 3.7 18.1 | 7.6 39.8 |
| Embodiment 1 | 0.03 | 10.8 | 384 | 3.9 18.6 | 7.8 41.1 |
| Embodiment 2 | 0.05 | 11.5 | 395 | 3.8 18.5 | 7.6 40.3 |
| Embodiment 3 | 0.1 | 11.1 | 378 | 3.7 18.1 | 7.6 39.5 |
| Embodiment 4 | 0.15 | 10.6 | 389 | 3.7 17.8 | 7.8 41.3 |

It can be seen from the above embodiments and comparative examples that the cement grinding aid provided by the present invention does not contain chlorine ions, is low in production cost, and has better strengthening effects, particularly more obvious later strength.

What is claimed is:

1. A cement grinding aid prepared with waste antifreeze, comprising the following components in parts by weight:

| | |
|---|---|
| pretreated waste antifreeze | 20-75 parts, |
| alkanolamine | 5-40 parts, |
| acid solution | 1-5 parts, |
| saccharide | 3-12 parts, |
| water | 15-50 parts. |

2. The cement grinding aid of claim 1, comprising the following components in parts by weight:

| | |
|---|---|
| pretreated waste antifreeze | 25-55 parts, |
| alkanolamine | 5-35 parts, |
| acid solution | 1-5 parts, |
| saccharide | 5-10 parts, |
| water | 20-40 parts. |

3. The cement grinding aid of claim 1, wherein the pretreated waste antifreeze is prepared by the following method: adding an alkaline solution into waste antifreeze to regulate pH value to 8-12, adding a flocculant, and stirring and standing; separating upper-layer oil, and then filtering to remove flocculent precipitates, thus obtaining a clear mixed solution.

4. The cement grinding aid of claim 3, wherein the alkaline solution is an aqueous solution of any of NaOH, KOH, triethanolamine, triisopropanolamine, diethanolisopropanolamine, N,N,N',N'-tetra(2-ethoxy)ethylenediamine and ethanoldiisopropanolamine, and the mass concentration of solute is within the range of 20-99%.

5. The cement grinding aid of claim 3, wherein the flocculant is one compound or more compounds selected from a group consisting of aluminum sulfate, polyaluminum sulfate and polyacrylamide.

6. The cement grinding aid of claim 3, wherein the mass ratio of the flocculant to the pretreated waste antifreeze is (0.01-0.03): 1.

7. The cement grinding aid of claim 3, wherein standing time is 2-8 hours.

8. The cement grinding aid of claim 1, wherein the alkanolamine is any one of or a mixture of several of diethanolisopropanolamine, N,N,N',N'-tetra(2-ethoxy)ethylenediamine and N-methyldiethanolamine.

9. The cement grinding aid of claim 1, wherein the acid solution is an aqueous solution of any one of acetic acid, sulfuric acid, hydrochloric acid and phosphoric acid, wherein the mass concentration of solute is 30-99%.

10. The cement grinding aid of claim 1, wherein the saccharide is at least one of or a mixture of several of molasses, corn syrup, glucose, saccharose and gluconic acid as well as salts of the glucose, saccharose or gluconic acid.

* * * * *